Patented Sept. 3, 1940

2,213,457

UNITED STATES PATENT OFFICE 2,213,457

COMPLEX MERCURY-METHYLXANTHINE COMPOUNDS

Max Bockmühl, Leonhard Middendorf, and Paul Fritzsche, Frankfort-on-the-Main, Germany, assignors to Winthrop Chemical Company, Inc., New York, N. Y., a corporation of New York No Drawing. Application October 26, 1937, Serial No. 171,058. In Germany October 27, 1936

6 Claims. (Cl. 260—242)

The present invention relates to solid molecular compounds, more particularly to solid molecular compounds between complex mercury compounds and alkylpurines, and to a process of preparing them.

Processes of preparing molecular compounds in a dissolved form consisting of complex mercury compounds and alkylpurines are performed for a long time in the industry. These processes consist in dissolving in water salts of complex mercury compounds and the corresponding alkylpurine. This kind of medicine is, of course, only suitable for the parenteral application of this therapeutic agent and cannot directly be used for other applications, for instance as tablets or suppositories. Thus it was only possible to apply the mixtures of the single solid components and not the molecular compounds. This method, however, has the considerable drawback that the preparations thus obtained cannot be tolerated without irritation.

Now we have found that it is possible to obtain in a solid form the molecular compounds from complex mercury compounds and alkylpurines from their aqueous solutions by the addition of suitable precipitating agents or by evaporating the solutions.

As a mercury compound there may especially be used the sodium-{O-[8-(hydroxymercuri)-β-methoxypropyl-carbamyl]phenoxy}acetate of the following formula:

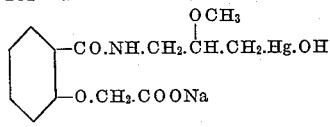

as alkylpurines there are of importance the methyl compounds, i. e. both the dimethyl compounds and the trimethyl compounds. There may especially be used theophylline, theobromine and caffeine.

The process may be performed, for instance, by mixing the aqueous solutions of the molecular compounds, suitably after a partial evaporation, with alcohol and ether whereby the molecular compounds immediately separate in a solid form and may be isolated by centrifuging and filtering with suction. The process may be advantageously be carried out also in that manner that the aqueous solutions are evaporated to dryness which may be carried out, if necessary, under reduced pressure. In both cases the starting compounds are suitably used in such a proportion that for one part of the alkylpurine at least two parts of the mercury compound are applied.

The molecular compounds thus obtained are a white powder which is not affected by the air and stable for an unlimited time whereas the complex mercury compounds per se are inclined to deliquesce and to decompose. The molecular compound very readily dissolves in water and methylalcohol, readily dissolves in ethylalcohol and is insoluble in ether and acetone.

These solid molecular compounds may be applied for the preparation of tablets or suppositories which have a high therapeutic action without having the drawback of an irritating effect.

The following examples serve to illustrate the invention but they are not intended to limit it thereto:

(1) 100 grams of the sodium-{O-[8-(hydroxymercuri)-β-methoxypropyl-carbamyl] phenoxy}-acetate and 45 grams of theophylline are dissolved in 1 liter of water, the solution is diluted with 10 times its quantity of ethylalcohol and mixed, while stirring, with ether until the turbidity remains. When the whole is allowed to stand a colorless crystalline precipitate separates which is filtered with suction, washed with ether and dried under reduced pressure. The compound is a colorless powder which is not affected by the air; it very readily dissolves in water and methylalcohol, readily dissolves in ethylalcohol and is insoluble in ether and acetone.

The same product is obtained by immediately precipitating the aqueous solution in acetone, filtering the colorless, powdery precipitate with suction and washing it with acetone.

(2) 300 grams of the sodium-{O-[8-(hydroxymercuri)-β-methoxypropyl-carbamyl] phenoxy}-acetate and 135 grams of theophylline are dissolved in 3 liters of water and the whole is dried with or without application of a reduced pressure, during which process the residue solidifies to a colorless crystalline mass which may readily be pulverized. The product thus obtained has the same properties as the compound prepared according to Example 1.

We claim:

1. The process which comprises dissolving in water sodium-{O-[8-(hydroxymercuri)-β-methoxypropyl-carbamyl]phenoxy}acetate and a methylxanthine and precipitating the complex compound thus formed.

2. The process which comprises dissolving in water sodium-{O-[8-(hydroxymercuri)-β-methoxypropyl-carbamyl]phenoxy}acetate and a methylxanthine, precipitating the complex compound thus formed and evaporating the solution.

3. A molecular compound of sodium-{O-[8-

(hydroxymercuri)-β-methoxypropyl-carbamyl]-phenoxy}acetate and a methylxanthine, said compound being very readily soluble in water and methylalcohol, readily soluble in ethylalcohol and insoluble in ether and acetone.

4. The molecular compound of sodium-{O-[8-(hydroxymercuri)-β-methoxypropyl-carbamyl]-phenoxy}acetate and theobromine, said compound being very readily soluble in water and methylalcohol, readily soluble in ethylalcohol and insoluble in ether and acetone.

5. The molecular compound of sodium-{O-[8-(hydroxymercuri)-β-methoxypropyl-carbamyl]-phenoxy}acetate and theobromine, said compound being very readily soluble in water and methylalcohol, readily soluble in ethylalcohol and insoluble in ether and acetone.

6. The molecular compound of sodium-{O-[8-(hydroxymercuri)-β-methoxypropyl-carbamyl]-phenoxy}acetate and caffeine, said compound being very readily soluble in water and methylalcohol, readily soluble in ethylalcohol and insoluble in ether and acetone.

MAX BOCKMÜHL.
LEONHARD MIDDENDORF.
PAUL FRITZSCHE.

Certificate of Correction

Patent No. 2,213,457.  September 3, 1940.

MAX BOCKMÜHL ET AL.

It is hereby certified that errors appear in the printed specification of the above numbered patent requiring correction as follows: Page 1, first column, line 29, and second column, lines 16, 34, 46, 51, and 55, and page 2, first column, lines 6 and 12, and second column, line 5, for the numeral "8" read $\gamma$; page 2, first column, line 8, for "theobromine" read *theophylline*; and that the said Letters Patent should be read with these corrections therein that the same may conform to the record of the case in the Patent Office.

Signed and sealed this 11th day of May, A. D. 1943.

[SEAL]

HENRY VAN ARSDALE,
*Acting Commissioner of Patents.*